(12) United States Patent
Destraves (10) Patent No.: US 10,339,435 B2
(45) Date of Patent: Jul. 2, 2019

(54) RADIOFREQUENCY TRANSPONDER FOR A TIRE

(71) Applicant: COMPAGNIE GENERALE DES ETABLISSEMENTS MICHELIN, Clermont-Ferrand (FR)

(72) Inventor: Julien Destraves, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/578,531

(22) PCT Filed: Jun. 3, 2016

(86) PCT No.: PCT/EP2016/062694
§ 371 (c)(1),
(2) Date: Nov. 30, 2017

(87) PCT Pub. No.: WO2016/193457
PCT Pub. Date: Dec. 8, 2016

(65) Prior Publication Data
US 2018/0174015 A1 Jun. 21, 2018

(30) Foreign Application Priority Data

Jun. 3, 2015 (FR) .................................... 15 55048

(51) Int. Cl.
*G06K 19/07* (2006.01)
*G06K 19/077* (2006.01)
(Continued)

(52) U.S. Cl.
CPC ... *G06K 19/07764* (2013.01); *B29D 30/0061* (2013.01); *B60C 19/00* (2013.01); *B60C 23/0447* (2013.01); *B60C 23/0452* (2013.01); *H01Q 1/2225* (2013.01); *H01Q 1/362* (2013.01); *H01Q 7/00* (2013.01); *H01Q 9/16* (2013.01); *H04B 1/24* (2013.01); *B29D 2030/0077* (2013.01); *B29K 2063/00* (2013.01);
(Continued)

(58) Field of Classification Search
CPC ......................... B60C 23/041; B60C 23/0452
USPC .......................................... 235/492; 340/447
See application file for complete search history.

(56) References Cited

U.S. PATENT DOCUMENTS

| 5,196,845 A | 3/1993 | Myatt ..................... 340/870.31 |
| 9,679,174 B2 | 6/2017 | Destraves et al. ........................... |
| | | G06K 7/10425 |

(Continued)

FOREIGN PATENT DOCUMENTS

WO    WO 2009/134243 A1    11/2009

OTHER PUBLICATIONS

Aug. 26, 2016 International Search Report and Written Opinion in International Patent Appln. No. PCT/EP2016/062694.

*Primary Examiner* — Daniel A Hess
(74) *Attorney, Agent, or Firm* — Venable LLP (57) ABSTRACT

A radiofrequency transponder includes a radiating antenna and an electronic device. The radiating antenna is a single-strand helical spring forming a dipole antenna. The electronic device includes an electronic chip and a primary antenna, which are encapsulated at least partially in a rigid, electrically insulating mass. The primary antenna is electromagnetically coupled to the radiating antenna.

23 Claims, 4 Drawing Sheets

(51) Int. Cl.

| | |
|---|---|
| *H04B 1/24* | (2006.01) |
| *B60C 23/04* | (2006.01) |
| *B29D 30/00* | (2006.01) |
| *B60C 19/00* | (2006.01) |
| *H01Q 1/22* | (2006.01) |
| *H01Q 1/36* | (2006.01) |
| *H01Q 7/00* | (2006.01) |
| *H01Q 9/16* | (2006.01) |
| *B29K 63/00* | (2006.01) |

(52) U.S. Cl.
CPC ...... *B60C 2019/004* (2013.01); *H01Q 1/2241* (2013.01)

(56) References Cited

U.S. PATENT DOCUMENTS

| | | | |
|---|---|---|---|
| 9,754,138 B2 | 9/2017 | Destraves et al. | ............................ G06K 7/10128 |
| 2009/0058625 A1* | 3/2009 | Suzuki | ................... B60C 23/041 340/447 |
| 2013/0153669 A1* | 6/2013 | Sinnett | ................ B60C 23/0452 235/492 |
| 2013/0229275 A1* | 9/2013 | Nakatani | ............. B60C 23/0452 340/447 |
| 2015/0083811 A1 | 3/2015 | Borot et al. | ............ B60C 19/00 |
| 2017/0341323 A1 | 11/2017 | Destraves et al. | ............................ B29D 30/0061 |

* cited by examiner

RADIOFREQUENCY TRANSPONDER FOR A TIRE

TECHNICAL FIELD

The present invention relates to an electronic radio identification device, or radiofrequency transponder, adapted to be fastened to an object to be identified, such as a tire, which is subjected to high thermo-mechanical stresses, particularly when in use.

TECHNICAL BACKGROUND

In the field of RFID (an abbreviation of Radio Frequency Identification) devices, radiofrequency transponders are conventionally used for the identification, monitoring and control of objects. These devices permit faster and more reliable automatic control.

Such a radiofrequency transponder usually consists of at least one electronic chip and an antenna, in the form of a magnetic loop or a radiating antenna, fastened to the object to be identified.

The communication performance of the radiofrequency transponder is expressed as a maximum distance of communication of the radiofrequency transponder with a radiofrequency reader for a given signal communicated to or by the radiofrequency reader.

In the case of highly extensible products such as tires, there is a need to identify the product throughout its life, from manufacture to withdrawal from the market, and, in particular, during its use. In order to facilitate this task, notably in conditions of use, high communication performance is required, this performance being expressed in terms of the possibility of interrogating the radiofrequency transponder at a long distance from the product, namely several meters, by means of a radiofrequency reader. Finally, it is desirable for the production cost of such a device to be as competitive as possible.

A radiofrequency transponder capable of meeting the requirements of tires is known from the prior art, notably from the document WO 2009/134243 A1. This transponder consists of an electronic chip, a printed circuit to which an electronic chip is electrically connected, and two metal helical springs connected mechanically and electrically to the printed circuit, forming a radiating dipole antenna. The communication with the radiofrequency reader uses radio waves, particularly the UHF (abbreviation of Ultra High Frequency) band. The characteristics of the helical springs, such as the wire diameter, the nature of the wire, the pitch of the helix and the length of the springs are therefore adjusted to the chosen communication frequency.

However, such a radiofrequency transponder has a number of drawbacks. Although part of the radiofrequency transponder is extensible, owing to the geometry of its antenna, there are still some areas of mechanical fragility with regard to high levels of stress in use. In particular, the mechanical connections between the helical springs and the printed circuit are rigid areas which form weak points for the endurance of the radiofrequency transponder.

Moreover, the process of manufacturing such a radiofrequency transponder is onerous. This is because the attachment of the helical springs to the printed circuit is a complicated operation, often performed manually, in which the ends of the three-dimensional helical springs must be fixed in the flat recess of the printed circuit, while the helical springs are also connected electrically to the tracks of the electronic circuit card. The latter operation cannot be performed using the conventional methods of the electronics industry.

Finally, the radiofrequency transponder must be fixed to the elastomer materials forming the tire. In particular, the joint between the rigid parts of the transponder and the elastomer products may require the use of special adhesion promoters.

The present invention relates to a radiofrequency transponder intended to improve the technical and economic performance of the radiofrequency transponders which are used in the tire industry as well as in other fields.

DESCRIPTION OF THE INVENTION

The invention relates to a radiofrequency transponder for integration into an object to be identified, made of a highly extensible material such as an elastomer mixture or composition. This radiofrequency transponder comprises an electronic chip and a radiating antenna communicating with a radiofrequency reader, and is characterized in that it is equipped with a primary antenna connected electrically to the electronic chip, in that the primary antenna is electromagnetically coupled to the radiating antenna, and in that the radiating antenna is a single-strand helical spring forming an electric dipole. The object to be identified may be, for example, a tire.

The term "elastomer" is here taken to mean the set of elastomers including TPEs (an abbreviation of thermoplastic elastomers), such as diene polymers, that is to say those comprising diene units, silicones, polyurethanes and polyolefins.

The term "electromagnetic coupling" is here taken to mean coupling by electromagnetic radiation, that is to say the transfer of energy without physical contact between two systems, including inductive coupling on one hand, and capacitive coupling on the other hand. The primary antenna is then preferably included in the group comprising a coil, a loop, a wire segment, or a combination of these conductive elements.

Thus, the absence of any mechanical connection between the radiating antenna and the electronic chip substantially improves the performance in terms of endurance of the radiofrequency transponder according to an object of the invention, relative to the radiofrequency transponder of the cited document.

Moreover, since the radiating antenna is not connected to any printed circuit, it may be embedded and fixed in a mass formed by elastomer mixtures, using elastomer-metal adhesive solutions well known to those skilled in the art, with or without the use of a special adhesion promoter. This simultaneously reduces the cost of using such a radiofrequency transponder in a rubber mass such as a tire.

Finally, when the electronic part of the radiofrequency transponder (consisting of the electronic circuit card and the primary antenna) is separated from the radiating antenna, it is possible to produce each component independently and then assemble them together in a later step. Thus the standard methods of each of the electronics and telecommunications industries may be used, thereby reducing the manufacturing costs of such a radiofrequency transponder.

Preferably, the primary antenna is a coil having at least one turn, regardless of whether the turn is circular, square or rectangular in shape.

For the UHF frequency ranges, it is preferable to select inductive coupling using two coils, represented by the single-strand helical spring on one hand and the coil with its turns on the other hand.

According to a particular embodiment, the primary antenna, having an axis of symmetry, is circumscribed in a circle whose axis of revolution is parallel to the axis of the primary antenna, and whose diameter is greater than or equal to a third, or preferably a half, or two thirds, of the inside diameter of the helical spring of the radiating antenna.

By specifying the relative dimensions of the turn of the primary antenna with respect to the characteristics of the helical spring of the radiating antenna, it is possible to ensure that the distance between the two antennas will be smaller than the diameter of the primary antenna, if the primary antenna is located inside the radiating antenna. Thus the inductive coupling between the two antennas is optimized, and consequently the communication performance of the radiofrequency transponder is also optimized in transmission and reception.

According to a preferred embodiment, the axis of revolution of the radiating antenna and the axis of symmetry of the primary antenna are substantially parallel.

The term "substantially parallel" is here taken to mean that the angle generated by the axial directions of each antenna is less than or equal to 30 degrees. In this case, the electromagnetic coupling between the two antennas is optimal, thus notably improving the communication performance of the radiofrequency transponder.

Preferably, the mid-plane of the coil of the primary antenna is substantially superimposed on the mid-plane of the helical spring of the radiating antenna.

The mid-plane of the coil and of the helical spring should be defined at this point. By definition, it is an imaginary plane separating the object into two equal parts. In the present case, this mid-plane is perpendicular to the axis of symmetry of each antenna, and is located in the center of the length of each antenna. Finally, the expression "substantially superimposed" is here taken to mean that the relative distance between the mid-planes is smaller than one tenth of the length of the radiating antenna.

Thus, since the electric current strength is maximal at the center of a coil, the magnetic field induced by this current is also maximal at the center of the coil; thus it is ensured that the inductive coupling between the two antennas is optimal, thereby improving the communication performance of the radiofrequency transponder.

According to a preferred embodiment, the radiating antenna has a real peripheral surface S located facing the primary antenna which has a real peripheral surface s located facing the radiating antenna, the ratio of the surfaces S/s being between 3 and 8, or preferably between 4 and 6.

The term "real peripheral surface" is here taken to mean the surface of revolution about the axis of the antenna passing through at least one radial extremum of the turn of the antenna and extending axially perpendicular to the turn along the whole length of the antenna. Also, the term "turn" is here taken to mean the electrically conductive part of the turn.

In the case of a coil having adjoining turns, the resultant surface is a cylinder having a radius equal to the extremum of the antenna taken as the reference and a length equal to the axial distance of the antenna. In the case of the radiating antenna, it is a helical surface with an axis corresponding to the axis of the radiating antenna, having a pitch corresponding to the pitch of the radiating antenna, and with a radius corresponding to the radial distance of the extremum taken as the reference for the elementary turn of the radiating antenna.

Finally, it should be understood that only the real inner or outer surface of the antennas is used, on the basis of the location of the radiating antenna relative to the primary antenna.

Thus the energy transfer between the two antennas of the radiofrequency transponder according to the invention requires a minimal exchange surface between the two antennas in order to obtain satisfactory radio communication performance.

Preferably, the primary antenna being connected to the terminals of an electronic circuit card comprising the electronic chip, the impedance of the primary antenna is adapted to the impedance of the electronic circuit card of the radiofrequency transponder.

The term "impedance of the electronic circuit card" is taken to mean the impedance at the terminals of the primary antenna, which represents the impedance of the electronic circuit card comprising at least one electronic chip and a printed circuit to which the electronic chip is connected.

By matching the impedance of the primary antenna to that of the electronic circuit card, the radiofrequency transponder is optimized at the communication frequency, improving the gain and providing a more selective form factor and narrower bandwidth of the electronic circuit card. Thus the communication performance of the radiofrequency transponder is improved for the same amount of energy transmitted to the radiofrequency transponder. This is manifested, in particular, by an increase in the reading distance of the radiofrequency transponder. For the radiofrequency transponder in the cited document, it is not easy to design the radiating antenna, which on the one hand must meet the condition of impedance matching of the electronic part, and, on the other hand, must satisfy the condition of electrical resonance for the transmission of the radio waves.

The impedance matching of the primary antenna is achieved by adjusting at least one of the geometric characteristics of the primary antenna, for example the diameter of the wire, the material of this wire and the length of the wire.

The impedance matching of the primary antenna may also be achieved by adding an impedance transformation circuit consisting of additional electronic components between the primary antenna and the electronic circuit, such as inductance- and capacitance-based filters and transmission lines.

The impedance matching of the primary antenna may also be achieved by combining the characteristics of the primary antenna with the characteristics of an impedance transformation circuit.

According to a particular embodiment, the electronic chip and at least a part of the primary antenna are embedded in a rigid, electrically insulating material such as high-temperature epoxy resin. The assembly forms the electronic part of the radiofrequency transponder.

Thus the electronic part, comprising at least a part of the primary antenna and the electronic chip connected to the printed circuit, is stiffened, making the mechanical connections between its components more reliable when subject to the thermo-mechanical stresses in the object to be identified.

This also enables the electronic part of the radiofrequency transponder to be produced industrially, independently of the radiating antenna or the object to be identified. Notably, the miniaturization of the electronic component comprising the primary antenna and the electronic chip may be feasible, for example by using a micro-coil with turns as the primary antenna.

According to another embodiment, the part of the primary antenna that is not embedded in the rigid mass is covered with an electrically insulating material.

Thus, if the primary antenna is not entirely contained in the rigid mass providing electrical insulation from the electronic part, it is useful to insulate it by means of a covering of an electrically insulating material such as an insulating sheath for an electrical cable.

According to a preferred embodiment, the electronic part of the radiofrequency transponder is located inside the radiating antenna.

Thus the electromagnetic coupling is optimized, since, on the one hand, the magnetic field generated by the radiating antenna is maximal and uniform within the helical spring, except at its ends. The communication performance of the radiofrequency transponder is therefore optimized in transmission and reception.

According to a particular embodiment, the geometry of the electronic part of the radiofrequency transponder is inscribed in a cylinder whose diameter is less than or equal to the inside diameter of the radiating antenna, and whose axis of revolution is parallel to, or coaxial with, the axis of the primary antenna.

The electronic part formed in this way can be used, if it is placed inside the radiating antenna, to provide optimized pre-positioning of the primary antenna relative to the radiating antenna, to improve the communication performance in reception/transmission of the radiofrequency transponder. This is because it is ensured mechanically that the two antennas are parallel, and that the distance between them creates a high-quality inductive coupling.

According to another preferred embodiment, the electronic part of the radiofrequency transponder is located outside the radiating antenna.

Thus the electromagnetic coupling is optimized, since the magnetic field generated by the primary antenna is maximal and uniform within the coil, except at its ends. The communication performance of the radiofrequency transponder is improved in transmission to the radiofrequency reader. Furthermore, it is then easier to position additional electronic components on the printed circuit comprising the electronic chip, which is located outside the radiating antenna.

According to a particular embodiment, the electronic part of the radiofrequency transponder has a cylindrical cavity adapted to receive the radiating antenna. Additionally, the diameter of the circle inscribed in the primary antenna is less than three times, or preferably two times, the outside diameter of the radiating antenna.

Thus, placing the radiating antenna inside the primary antenna ensures that the electromagnetic coupling between the radiating antenna and the primary antenna is optimal, because of the relative positioning between the two antennas in terms of distance and parallelism.

According to a particular embodiment, the electronic chip being electrically connected to a printed circuit to form the electronic circuit card, the printed circuit comprises one or more additional passive or active electronic components.

These electronic components may be, for example, a microprocessor, a memory, a battery, a pressure sensor, a temperature sensor, and/or an accelerometer. This enables the functionality of the radiofrequency transponder to be enriched by multiplying the data that it obtains.

The invention also proposes an identification patch consisting of a radiofrequency transponder embedded in a flexible, electrically insulating mass of elastomer mixtures.

The term "electrically insulating" is here taken to mean that the electrical conductivity of the elastomer mixture is below the threshold of percolation of conductive charges of the mixture.

Thus an identification patch is formed which facilitates the placing of the radiofrequency transponder in objects to be identified which comprise parts made of elastomer-based material. An ordinary rubber binder layer may be used if necessary, to fix the identification patch to the object, such as a tire, to be identified.

The rigidity and electrical conductivity characteristics of the elastomer mixture also ensure that the mechanical insertion and electrical insulation of the radiofrequency transponder in the components of the object to be identified are of high quality. Thus the operation of the radiofrequency transponder is not interfered with by the object to be identified.

The invention additionally proposes a method for manufacturing the radiofrequency transponder, comprising the following steps:

a helical spring of a size adapted to the communication frequency of the radio signal of the radiofrequency transponder is produced, to form the radiating antenna of the radiofrequency transponder, an electronic chip is electrically connected to a printed circuit, to form an electronic circuit card, a primary antenna is made, using a conductive wire, the primary antenna is electrically connected to the electronic circuit card, at least a part of the primary antenna and the electronic circuit card is embedded in a rigid, electrically insulating mass such as a thermosetting resin to form the electronic part of the radiofrequency transponder, the electronic part and the radiating antenna are positioned by a simple insertion process in such a way that, the primary antenna having an axis of symmetry and a mid-plane and the radiating antenna having an axis of revolution and a mid-plane, the axes of the two antennas are substantially parallel and the mid-planes of the two antennas are substantially superimposed.

Thus, the manufacture of the radiofrequency transponder is simplified by producing the electronic part and the radiating antenna of the radiofrequency transponder separately. Additionally, the step of assembling the two components requires no mechanical or electrical connection between the two components, thereby drastically reducing the manufacturing costs of the radiofrequency transponder.

According to a particular embodiment, a manufacturing method according to the invention comprises a step of producing a primary antenna of the coil type, having at least one turn and comprising an axis of symmetry which is circumscribed in a circle whose axis of revolution is parallel to the axis of symmetry and whose diameter is greater than or equal to a third of the inside diameter of the radiating antenna.

These complementary characteristics relate to a variant of the primary antenna which allows inductive coupling in the UHF frequency range.

According to a preferred embodiment, a manufacturing method according to the invention comprises a step of covering the part of the primary antenna that is not embedded in the rigid, electrically insulating mass with an electrically insulating material.

This characteristic is useful for obtaining high-quality electromagnetic coupling between the radiating antenna and the primary antenna, while avoiding any physical contact between the conductive parts of the two antennas.

Preferably, a manufacturing method according to the invention comprises a step of adapting the impedance of the primary antenna to the impedance of the electronic circuit card.

This can improve the efficiency of the primary antenna.

According to a preferred embodiment, a manufacturing method comprises a step of adding one or more additional passive or active electronic components to the printed circuit equipped with the electronic chip to form the electronic circuit card.

Thus the functionality of the radiofrequency transponder is improved by introducing this step which is purely related to the electronics industry from the time of the design of the electronic circuit card.

The invention also proposes a method for manufacturing the identification patch, in which a radiofrequency transponder is incorporated in a flexible, electrically insulating mass of at least one elastomer mixture, by a process of injection, compression or extrusion.

Thus, regardless of the state of the elastomer, which may be raw or cured, the identification patch can easily be incorporated into an object to be identified, such as a tire, comprising elastomer products, using conventional elastomer-to-elastomer adhesion methods if necessary. This incorporation may take place either during the manufacture of the object, for example in a raw tire blank, and in particular before the curing or vulcanization of the elastomers, or in a step subsequent to the method of manufacturing the object to be identified, for example directly on to the inner or outer faces of the tire.

BRIEF DESCRIPTION OF THE DRAWINGS

The invention will be more readily understood from a reading of the following description in the case of application to pneumatic tires. This application is given solely by way of example, with reference to the appended drawings, in which.

DETAILED DESCRIPTION OF EMBODIMENTS

In the following text, the terms "tire" and "pneumatic tire" are used in an equivalent manner and relate to any type of tire, whether pneumatic or non-pneumatic (referred to in English as a "tire", "pneumatic tire", or "non-pneumatic tire").

Figure 1:
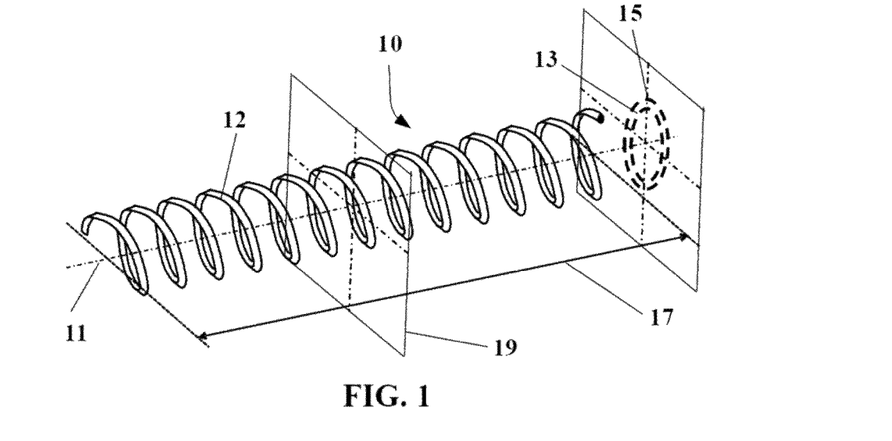
FIG. 1 shows a detail view of a radiating antenna according to the invention.

FIG. 1 shows a radiating antenna 10 consisting of a steel wire 12 which has been plastically deformed to form a helical spring having an axis of revolution 11. The helical spring is defined, in the first place, by a winding diameter of the covered wire and a helix pitch. Thus, the inside diameter 13 and outside diameter 15 of the helical spring are determined precisely, allowing for the diameter of the wire. The length of the spring 17 corresponds here to the half wavelength of the transmission signal of the radiofrequency transponder 1 in a mass of elastomer mixture. Thus a mid-plane 19 in the helical spring can be defined, perpendicular to the axis of revolution 11, dividing the radiating antenna into two equal parts. The actual peripheral surface S of the radiating antenna 10 is evaluated on the basis of the helix pitch, the diameter of the steel wire 12, the length 17 of the radiating antenna 10 and, if appropriate, the inside diameter 13 or the outside diameter 15 of the helical spring.

Figure 2:
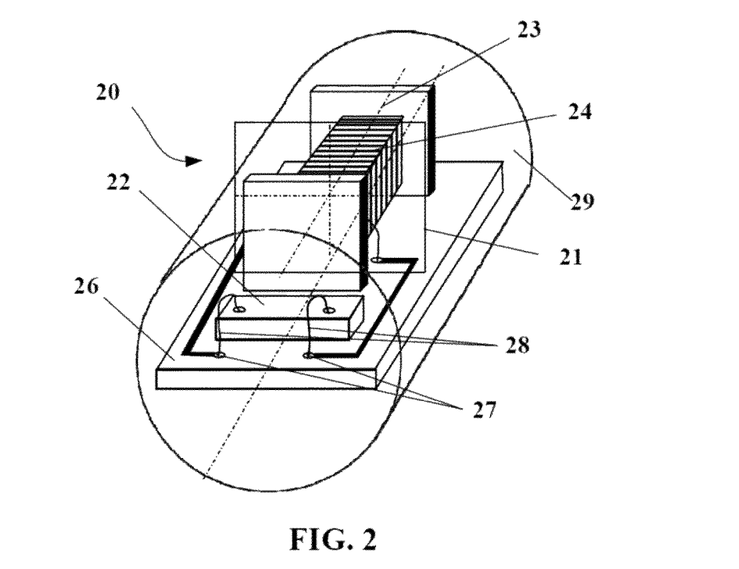
FIG. 2 shows a perspective view of the electronic part of a radiofrequency transponder according to the invention, in a configuration in which the electronic part is to be positioned inside the radiating antenna.

FIG. 2 shows the electronic part 20 of a radiofrequency transponder 1 intended for a configuration in which the electronic part 20 is located inside the radiating antenna 10. The electronic part 20 comprises an electronic chip 22 and a primary antenna 24 electrically connected to the electronic chip 22 via a printed circuit 26. The primary antenna here consists of an SMC (an abbreviation for Surface-Mount Component) micro-coil having an axis of symmetry 23. The mid-plane 21 of the primary antenna is determined, this mid-plane being defined by a normal parallel to the axis of symmetry 23 of the SMC coil and dividing the coil into two equal parts. The electrical connection between the components on the printed circuit is formed by means of copper tracks terminating at copper pads 27. The electrical connection of the components to the printed circuit is formed by the method known as "wire bonding", using gold wires 28 between the component and the pads 27. The assembly formed by the printed circuit 26, the electronic chip 22 and the primary antenna 24 is embedded in a rigid mass 29 of electrically insulating high-temperature epoxy resin forming the electronic part 20 of the radiofrequency transponder 1.

Figure 3:
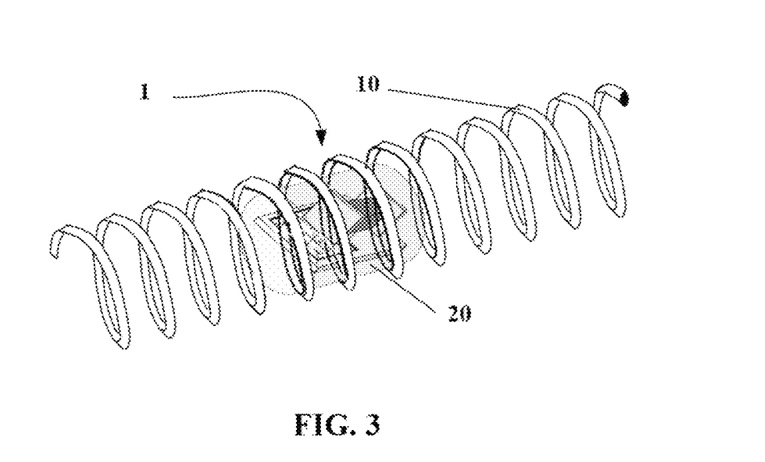
FIG. 3 shows a perspective view of a radiofrequency transponder according to the invention, in a configuration in which the electronic part is located inside the radiating antenna.

FIG. 3 a radiofrequency transponder 1 in a configuration in which the electronic part 20 is located inside the radiating antenna 10. The geometric shape of the electronic part 20 is circumscribed in a cylinder whose diameter is less than or equal to the inside diameter 13 of the helical spring. This facilitates the insertion of the electronic part 20 into the radiating antenna 10. The mid-plane 21 of the primary antenna is substantially superimposed on the mid-plane 19 of the radiating antenna 10.

Figure 4:
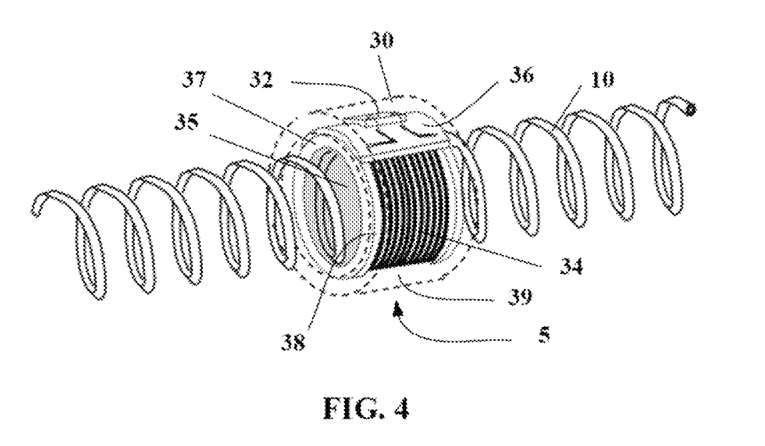
FIG. 4 shows a perspective view of a radiofrequency transponder according to the invention, in a configuration in which the electronic part is located outside the radiating antenna.

FIG. 4 shows a radiofrequency transponder 5 in a configuration in which the electronic part 30 is located outside the radiating antenna 10. The geometric shape of the electronic part 30 includes a cylindrical cavity 35 whose diameter is greater than or equal to the outside diameter 15 of the radiating antenna 10. This facilitates the insertion of the radiating antenna 10 into the cylindrical cavity 35 of the electronic part. The mid-plane of the primary antenna is substantially in the mid-plane of the radiating antenna 10.

Figure 5:
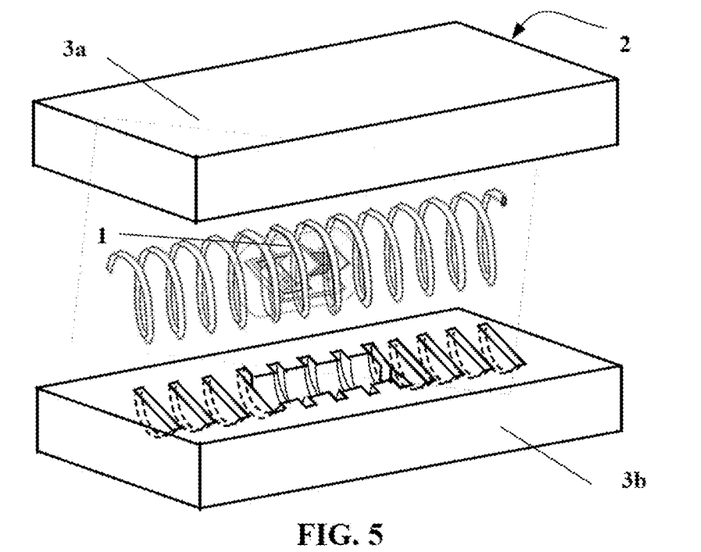
FIG. 5 is an exploded view of an identification patch.

FIG. 5 shows an identification patch 2 comprising a radiofrequency transponder 1 embedded in a flexible mass 3 of electrically insulating elastomer material represented by the plates 3a and 3b. Here, the radiofrequency transponder 1 is in a configuration in which the electronic part 20 is located inside the radiating antenna 10.

Figure 6:
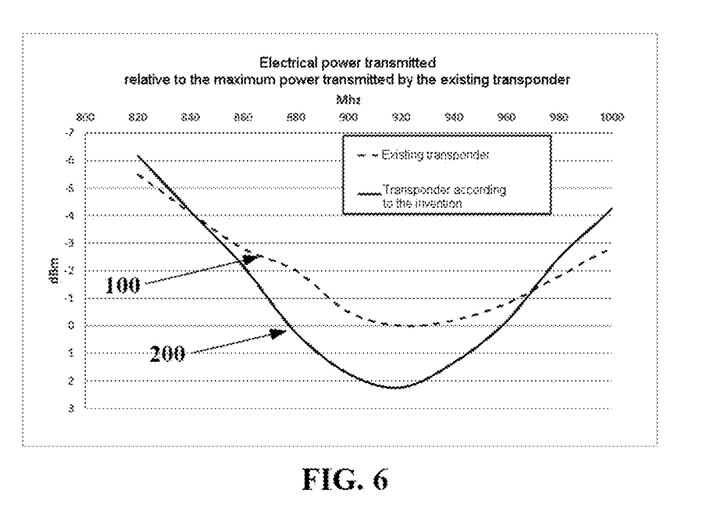
FIG. 6 shows a graph of the electrical power transmitted at two radiofrequency transponders according to the observation frequency band.

FIG. 6 is a graph of the electrical power transmitted by a radiofrequency transponder located inside a Michelin XIN-CITY 275/70 R22.5 tire casing to a radiofrequency reader. The measurement protocol used corresponds to the ISO/IEC 18046-3 standard entitled "Identification Electromagnetic Field Threshold and Frequency Peaks". The measurements were made for wide-frequency scanning, and not on a point basis as is the usual practice. The horizontal axis represents the frequency of the communication signal. The vertical axis is the electrical power received by the radiofrequency reader, expressed in decibels relative to the maximum electrical power transmitted by an existing prior art radiofrequency transponder. The curve in broken lines 100 represents the response of a radiofrequency transponder according to the cited document. The curve in solid lines 200 represents the response of a transponder according to the invention for the same signal transmitted by the radiofrequency reader. It should be noted that there is a gain of two decibels in favour of the radiofrequency transponder according to the invention at the central communication frequency of the radiofrequency reader. The gain remains at about one decibel in a wider frequency band around the communication frequency.

Figure 7:
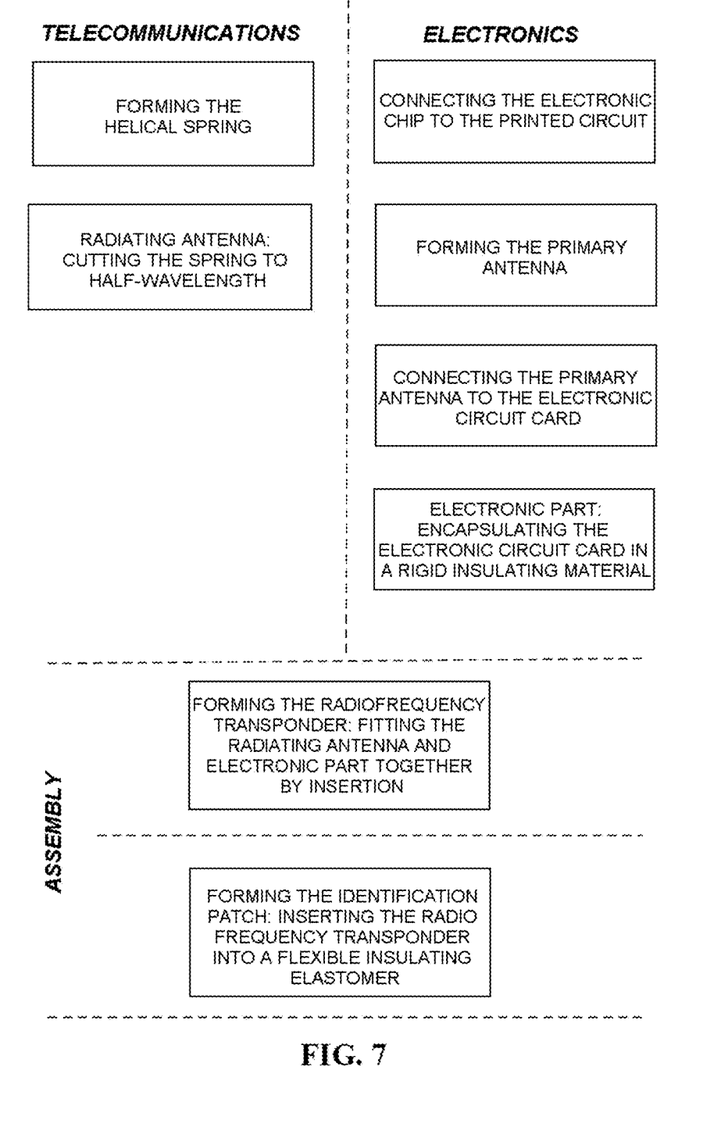
FIG. 7 is a synoptic diagram of a method for manufacturing an identification patch, comprising a radiofrequency transponder according to the invention.

FIG. 7 is a synoptic diagram of the method for manufacturing an identification patch 2 according to the invention. The production of the identification patch 2 requires the initial manufacture of a radiofrequency transponder 1, 5 according to the invention. The various chronological steps in the manufacture of the radiofrequency transponder 1, 5 are identified, followed by those for the identification patch 2. The steps related to the telecommunications or electronics trades are clearly delimited from those related to the assembly, which may be performed by the tire manufacturer for example, for an application to pneumatic tires.

With reference to FIG. 7, showing a synoptic diagram of the manufacture of an identification patch 2, three successive and independent phases may be distinguished.

In a first phase, corresponding to the telecommunications trade, the radiating antenna 10 is formed, this antenna being used for the transmission and reception of radio waves with the radiofrequency reader.

According to a specific embodiment, the first step consists in the plastic deformation of the steel wire 12 with an outside diameter of 200 micrometers, to form a helical spring having a helix pitch of 1.5 mm, using suitable industrial means such as a spring winding lathe. This produces a continuous spring having an outside diameter 15 of about 1.6 millimeters, which is small relative to the desired length 17 of the final radiating antenna, which is between 40 and 60 millimeters, for example 50 millimeters. Heat treatment may be applied after this step of plastic deformation, by heating at over 200° Celsius for at least 30 minutes, to relax the stresses in the helical spring formed in this way.

The second step is to cut the helical spring, by laser cutting, to the desired length, corresponding to the half wavelength of the frequency of the radio communication signals, with allowance for the propagation speed of these waves in an elastomer medium, that is to say about 50 millimeters. The resulting mechanical component represents the radiating antenna 10 according to the invention.

In a second phase, the electronic part 20 of the radiofrequency transponder 1 is produced, this part being used for the interrogation and response of the electronic chip 22 to the radiating antenna 10. The transmission of information between the radiating antenna 10 and the electronic part 20 is carried out by electromagnetic coupling, using a primary antenna 24.

This electronic device, encapsulated in the rigid mass 29, is composed of an electronic chip 22 on the one hand, and of a primary antenna 24 on the other hand.

A first embodiment of this electronic device is shown in FIG. 3 in the configuration in which the electronic part 20 is to be located inside the radiating antenna 10. In a preferred embodiment, the lead frame method is used to provide electromechanical support for the primary antenna 24 and for the electronic chip 22 representing the equivalent of a printed circuit 26. This method is particularly suitable for this configuration, because of its ease of miniaturization.

The first step is to compose the electronic circuit card. For this purpose, the electronic chip 22 is initially fixed to the grid or lead frame, using a conductive adhesive such as H20E, marketed under the Tedella brand. The wiring of the chip is carried out by the wire bonding method, that is to say by forming an electrical link using, for example, gold wires 28 with a diameter of 20 micrometers between the electronic chip 22 and the printed circuit 26 represented by the grid. The impedance of the electronic circuit card can then be measured at the points where the primary antenna 24 is fixed to the grid, using a suitable electrical apparatus such as an impedance meter.

The second step is to produce the primary antenna 24. In one embodiment not shown in the appended drawings, this antenna is formed by a coil with circular turns constructed directly on the grid (lead frame) by the wire-bonding process. Another variant of the primary antenna, not shown, consists in creating an antenna using two copper wire segments connected to the electronic circuit card by a metal soldering method used in the electronics industry, these segments being orientated in opposite directions to form a dipole. For the construction of the coil with turns on the grid, a gold wire with a diameter of 20 micrometers is used; it would also be possible to use aluminium or copper palladium wire to form the half-turns of the coil on the rear face of the grid. The diameter of a half-turn is 400 micrometers, and the ultrasound method, which is conventional in the semiconductor industry, is used for electrically connecting the gold wires to the grid. The other half-turn is then formed on the front face of the grid, to form a cylindrical coil with 15 turns, having a diameter of 400 micrometers.

The number of turns of the primary antenna 24 is determined in such a way that the impedance of the primary antenna 24 is matched to the impedance of the electronic circuit card comprising at least the printed circuit 26 represented by the grid and the electronic chip 22. In the present case, the impedance of the electronic chip 22 alone is a complex number having a value of (10−j*150) ohms, for example. Thus a 15-turn coil with a diameter of 400 micrometers corresponds to a good matching of the impedance of the electronic circuit card constructed on a copper grid of connections.

The last step in producing the electronic part 20 is to encapsulate the printed circuit 26, the components connected to it, and the primary antenna 24, using a high-temperature epoxy resin, in a rigid mass 29. The glob-top process, well known to those skilled in the art, is used for this purpose. The rigid mass 29 forms a capsule protecting the electronic circuit card of the radiofrequency transponder 1.

In another embodiment of the electronic device, to be placed inside the radiating antenna 10, the first step is to produce the primary antenna 24, using a 180 micrometer copper wire covered with an electrically insulating thermoplastic sheath. This wire is wound on a rigid, electrically insulating tubular core, forming a coil of about twelve turns, with an outside diameter of 1 millimeter and a helix pitch of 0.2 millimeter, terminating in two bare ends. The actual peripheral surface s of the primary antenna 24 can then be evaluated on the basis of the diameter of the copper wire, the outside diameter of the antenna, the helix pitch and the total number of turns. In this case, the radius of the helical surface is 500 micrometers, because the primary antenna 24 is located inside the radiating antenna 10.

The electronic circuit card is formed with the aid of a flexible support. In a first variant, the electronic chip 22 is fixed with the aid of an ACP (abbreviation for Anisotropic Conductive Paste) conductive adhesive not requiring any electrical wiring between the chip 22 and the electronic circuit card. In a second variant, the electronic chip 22 is fixed with the aid of a non-conductive adhesive for assembling electronic components. The wiring of the chip 22 to the electronic circuit card is carried out by the wire bonding method, that is to say by forming an electrical link using, for example, gold wires 28 with a diameter of 20 micrometers positioned between the electronic chip 22 and the flexible support representing the printed circuit 26.

The two bare ends of the primary antenna 24 are then connected to the printed circuit 26, using a conductive adhesive such as H20E, marketed under the Tedella brand.

Finally, the electronic circuit card and the bare terminations of the primary antenna 24 are covered with an electrically insulating rigid material of the high-temperature epoxy resin type, by the glob-top method which is well known to those skilled in the art.

In a second embodiment of the electronic part 30, when this part is to be located outside the radiating antenna 10, the procedure is as follows. Part of the electronic circuit card is produced initially.

In a first step, an electronic chip 32, and additional components if necessary, are connected to a flexible support forming the printed circuit 36 (known in English as a "flex PCB"), using the ultrasound method which is conventional in the microelectronics industry, in order to compose the electronic circuit card. The impedance of the electronic circuit card is measured by means of a suitable electric apparatus such as an impedance meter at the terminals of the copper connections on the upper face of the flexible printed circuit where the primary antenna will be connected. Each of the copper connections has a central cavity passing through the thickness of the flexible support, as far as the lower face of the support.

In a second step, the primary antenna 34 is formed around a tube 37 of electrically insulating resin whose inside diameter, delimiting the cylindrical cavity 35 of the electronic part, is greater than or equal to the outside diameter 15 of the helical spring of the radiating antenna 10, that is to say about 1.3 millimeters. The thickness of this tube is about 0.5 millimeter. Each end of the tube has an increased thickness of 0.5 millimeter, forming a rim 38 with a width less than or equal to 0.5 millimeter.

A copper wire with a diameter of 200 micrometers is wound on the outer face of the tube 37, between the two rims 38, to form a given number of turns so as to produce a primary antenna 34 in the form of a cylindrical coil having an impedance matched to the impedance of the electronic circuit card to which it is to be electrically connected.

The flexible printed circuit 36 of the electronic circuit card formed in the first step is fixed to the rims 38 of the tube 37 of insulating resin, using a conductive adhesive of the H20E type, marketed under the Tedella brand. Before this, each of the ends of the copper wire of the primary antenna 34 has been inserted between a rim 38 of the tube 37 and the flexible printed circuit 36, which are the two parts to be assembled.

Finally, an electrical connection is made by brazing with a conductive metal such as copper, via the cavity passing through the flexible printed circuit 36 at the position of the copper connections. Thus the electronic device formed by the electronic circuit card and the primary antenna 34 is produced.

In the final step, the electronic device is covered with a rigid, electrically insulating mass 39 with a thickness of at least 1 millimeter, in order to protect the electronic circuit card and the primary antenna 34 from various kinds of chemical attack, while providing mechanical protection for the electrical connections. An injection method is used, consisting in placing the electronic device in a mould. However, in order to preserve the cylindrical cavity 35 of the initial resin tube, an air-impermeable flexible elastomer membrane is placed so as to pass through the cylindrical cavity 35, this membrane being pressurized to seal the cylindrical cavity 35 against the propagation of the protective resin. A high-temperature epoxy resin, such as RESOL-COAT 1060ES7 resin marketed under the trade name RESOLTECH, is injected under pressure in the liquid state, at a pressure below that of the impermeable membrane. This method provides uniform distribution of the resin over the whole electronic device, with the exception of the cylindrical cavity 35. When the mould has been opened and the pressurization of the flexible membrane has been halted, the electronic device is extracted, the device still having the cylindrical cavity 35 but now being covered externally with a rigid mass 39 of electrically insulating resin. The assembly represents the electronic part 30 of the radiofrequency transponder 5.

The third phase of the production of the radiofrequency transponder 1 or 5 consists in assembling the radiating antenna 10, produced in the first step, on to the electronic part 20 or 30 made in the second step.

In a first configuration, in which the primary antenna 24 is to be located inside the radiating antenna 10, the procedure is as follows.

First of all, suitable long-nosed pliers are used to grip the electronic part 20, which is inscribed in a cylinder whose diameter is smaller than or equal to the inside diameter 13 of the radiating antenna 10 formed in the first step, that is to say about a millimeter.

The electronic part 20 is inserted into the radiating antenna 10, while the axis of symmetry 23 of the primary antenna is positioned in the direction of the axis of revolution 11 of the radiating antenna 10. Additionally, the electronic part 20 is pushed fully into the radiating antenna 10 until the mid-plane 21 of the primary antenna coincides with the mid-plane 19 of the radiating antenna. The electronic part 20 is then released from the long-nosed pliers and the pliers are carefully withdrawn from the inside of the radiating antenna 10.

The self-centring, parallel positioning of the axes and relative positioning of the mid-planes between the radiating antenna 10 and the primary antenna 24 are thus carried out in a way which promotes high-quality inductive coupling between the two antennas.

The assembly formed in this way represents a radiofrequency transponder 1 according to the invention.

In a second configuration in which the electronic part 30 is to be located outside the radiating antenna 10, the procedure is as follows.

The outside of the electronic part 30 formed in the second phase is fixed, using a vice for example. The radiating antenna 10 formed in the first phase is gripped with long-nosed pliers at one of its ends.

The other end of the radiating antenna 10 is then inserted into the cylindrical cavity 35 of the electronic part 30, and the radiating antenna 10 is guided with the aid of the long-nosed pliers through the cylindrical cavity 35 until the mid-plane 19 of the radiating antenna 10 coincides with the mid-plane of the primary antenna 34.

The radiating antenna 10 is then released by opening the ends of the long-nosed pliers. The assembly formed in this way represents a radiofrequency transponder 5 according to the invention.

The final step, after the completion of radiofrequency transponder 1 or 5, is to produce an identification patch 2 to facilitate the application of the radiofrequency transponder 1 or 5 to objects to be identified, which partially consist of elastomer mixtures. Regardless of the configuration of the radiofrequency transponder 1 or 5, the procedure for this step is as follows.

The radiofrequency transponder 1 or 5 formed in the preceding step is placed in the center of a flexible mass 3. As shown in FIG. 5 for example, the radiofrequency transponder 1 is sandwiched between two plates 3a and 3b of raw elastomeric material, the sizes of which are a function of that of the transponder radiofrequency 1, and which have a thickness of between 2 and 5 millimeters, for example. The longitudinal direction of the plates corresponds to the axis of the radiating antenna 10. The assembly is initially located on the inner face of a metal die of a press tool whose size is adapted to the volume of the elastomeric mass.

Using a metal punch complementary to the die, a compressive force is applied by means of press tool, for example a uniaxial tire press, to the assembly in order to form a compact geometry having an axis of symmetry, with a length of 60 millimeters for example, inscribed in a cylinder with a diameter of about 20 millimeters, corresponding to an identification patch 2 of the radiofrequency transponder 1 or 5 according to the invention.

Other methods, such as the extrusion or injection method, may be used to incorporate the radiofrequency transponder 1, 5 into a mass of one or more elastomer mixtures.

In a particular embodiment, adhesion promoters, which are well known to those skilled in the art, are used between the rigid mass 29, 39 of high-temperature epoxy resin encapsulating the electronic part 20, 30 of the radiofrequency transponder 1, 5 and the elastomer mixture of the identification patch 2. This may improve the endurance of the radiofrequency transponder in use.

Finally, the industrial installation of a radiofrequency transponder 1, 5 according to the invention for an object to be identified such as a pneumatic tire may be carried out according to at least two embodiments. In a first, preferred, embodiment, the radiofrequency transponder 1, 5 or the identification patch 2 of raw elastomer mixture simply has to be incorporated in the tire blank during the building of the pneumatic tire. The transponder or the identification patch 2 is placed geometrically between the various elastomeric components of the raw blank of the pneumatic tire. Ideally, it is placed in a geographic area subject to acceptable levels of deformation, to ensure that the radiating antenna 10 is not plastically deformed. The blank is subjected to various stages of tire manufacture, including heating in an autoclave, to vulcanize the various elastomer mixtures and to fix the transponder or the identification patch to the tire thus produced. The radiofrequency transponder 1, 5 is then ready for use.

Another preferred embodiment consists in fixing the elastomeric structure of the identification patch 2 by curing or vulcanization in a step subsequent to the manufacture of the identification patch 2. The device produced as a result of this operation is fixed to a receiving area of the pneumatic tire by a conventional elastomer-elastomer fixing method known to those skilled in the art, such as adhesion by cold curing of a layer of binder rubber to the inner rubber of the pneumatic tire. The radiofrequency transponder 1, 5 of the tire is then ready for use.

The invention claimed is:

1. A radiofrequency transponder useable in a mass of an elastomer mixture, the radiofrequency transponder comprising:
    an electronic chip;
    a radiating antenna structured to communicate with a radiofrequency reader, the radiating antenna being a dipole antenna formed of a single-strand, helical spring; and
    a primary antenna connected electrically to the electronic chip, the primary antenna being electromagnetically coupled to the radiating antenna,
    wherein the primary antenna and the electronic chip are disposed within a cylindrical cavity of the helical spring.

2. The radiofrequency transponder according to claim 1, wherein the primary antenna is a coil having at least one turn.

3. The radiofrequency transponder according to claim 2, wherein the primary antenna has an axis of symmetry and is circumscribable in a cylinder,
    wherein the cylinder has an axis of revolution that is parallel to the axis of symmetry of the primary antenna, and
    wherein the cylinder has a diameter that is greater than or equal to a third of an inside diameter of the helical spring of the radiating antenna.

4. The radiofrequency transponder according to claim 2, wherein a mid-plane of the coil of the primary antenna is substantially superimposed on a mid-plane of the helical spring of the radiating antenna.

5. The radiofrequency transponder according to claim 2, wherein:
    the radiating antenna has a real peripheral surface S facing the primary antenna,
    the primary antenna has a real peripheral surface s facing the radiating antenna, and
    a ratio of the real peripheral surface S of the radiating antenna to the real peripheral surface s of the primary antenna has a value S/s in a range between 3 and 8.

6. The radiofrequency transponder according to claim 1, wherein:
    the primary antenna has an axis of symmetry,
    the radiating antenna has an axis of revolution, and
    the axis of symmetry of the primary antenna and the axis of revolution of the radiating antenna are substantially parallel.

7. The radiofrequency transponder according to claim 1, wherein:
    the electronic chip is part of an electronic circuit card that includes terminals,
    the primary antenna is connected to the terminals of the electronic circuit card, and
    an impedance of the primary antenna is adapted to an impedance of the electronic circuit card.

8. The radiofrequency transponder according to claim 7, wherein:
    the electronic chip is electrically connected to a printed circuit to form the electronic circuit card, and
    the printed circuit includes one or more electronic components in addition to the electronic chip, the one or more electronic components being any combination of passive and active electronic components.

9. The radiofrequency transponder according to claim 1, wherein the electronic chip and at least a part of the primary antenna are embedded in a rigid, electrically insulating mass to form an electronic device of the radiofrequency transponder.

10. The radiofrequency transponder according to claim 9, wherein:
a part of the primary antenna is not embedded in the rigid, electrically insulating mass, and
the part of the primary antenna that is not embedded in the rigid, electrically insulating mass is covered with an electrically insulating material.

11. The radiofrequency transponder according to claim 9, wherein the electronic device is located inside the radiating antenna.

12. The radiofrequency transponder according to claim 11, wherein:
a geometry of the electronic device is inscribable in a cylinder having a diameter that is less than or equal to an inside diameter of the radiating antenna, and
the cylinder has an axis of revolution that is parallel to, or coaxial with, an axis of symmetry of the primary antenna.

13. The radiofrequency transponder according to claim 9, wherein the electronic device is located outside of the radiating antenna.

14. The radiofrequency transponder according to claim 13, wherein the electronic device has a cylindrical cavity structured to receive a portion of the radiating antenna therein.

15. The radiofrequency transponder according to claim 14, wherein a diameter of a circle inscribable in the primary antenna is less than three times an outside diameter of the radiating antenna.

16. The radiofrequency transponder according to claim 1, wherein the radiofrequency transponder is part of an identification patch that includes the radiofrequency transponder embedded in at least one electrically insulating and flexible elastomer mixture.

17. A method for manufacturing a radiofrequency transponder, the method comprising:
producing a radiating antenna of a radiofrequency transponder using a helical spring having a size adapted to a communication frequency of a radio signal of the radiofrequency transponder;
forming an electronic circuit card using an electronic chip that is electrically connected to a printed circuit;
forming a primary antenna using a conductive wire;
electrically connecting the primary antenna to the electronic circuit card;
forming an electronic part of the radiofrequency transponder by embedding at least a part of the primary antenna and the electronic circuit card in a rigid, electrically insulating mass; and
positioning the electronic part and the radiating antenna by an insertion process such that: an axis of symmetry of the primary antenna and an axis of revolution of the radiating antenna are substantially parallel, and a mid-plane of the primary antenna and a mid-plane of the radiating antenna are substantially superimposed,
wherein the electronic part formed by embedding at least a part of the primary antenna and the electronic circuit card in a rigid, electrically insulating mass is disposed within a cylindrical cavity of the helical spring.

18. The method according to claim 17, wherein the step of forming the primary antenna includes forming the conductive wire into a coil having at least one turn and an axis of symmetry, the coil being circumscribable in a circle having an axis of revolution that is parallel to the axis of symmetry of the coil and having a diameter that is greater than or equal to a third of an inside diameter of the radiating antenna.

19. The method according to claim 17, further comprising a step of covering a part of the primary antenna that is not embedded in the rigid, electrically insulating mass with an electrically insulating material.

20. The method according to claim 17, further comprising a step of matching an impedance of the primary antenna to an impedance of the electronic circuit card.

21. The method according to claim 17, wherein the step of forming the electronic circuit card includes adding to the printed circuit, which is equipped with the electronic chip, at least one of:
an additional passive electronic component, and
an additional active electronic component.

22. The method according to claim 17, wherein the rigid, electrically insulating mass is a thermosetting resin.

23. A method for manufacturing an identification patch, the method comprising:
obtaining a radiofrequency transponder that includes: (a) an electronic chip, (b) a radiating antenna structured to communicate with a radiofrequency reader, the radiating antenna being a dipole antenna formed of a single-strand, helical spring, and (c) a primary antenna connected electrically to the electronic chip, the primary antenna being electromagnetically coupled to the radiating antenna; and
incorporating the radiofrequency transponder in a flexible, electrically insulating mass of at least one elastomer mixture by one of: (a) an injection process, (b) an extrusion process, and (c) a compression process,
wherein the electronic chip and the primary antenna are disposed within a cylindrical cavity of the helical spring.

* * * * *